US010641064B2

(12) United States Patent
Lazzarin et al.

(10) Patent No.: US 10,641,064 B2
(45) Date of Patent: May 5, 2020

(54) CONNECTING SYSTEM AND METHOD FOR CONNECTING TWO CONDUITS IN A BODY OF WATER

(71) Applicant: SAIPEM S.p.A., San Donato Milanese (IT)

(72) Inventors: Diego Lazzarin, San Donato Milanese (IT); Gianluca Toso, San Donato Milanese (IT); Alessandro Radicioni, San Donato Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 16/321,733

(22) PCT Filed: Aug. 2, 2017

(86) PCT No.: PCT/IB2017/054733
§ 371 (c)(1),
(2) Date: Jan. 29, 2019

(87) PCT Pub. No.: WO2018/025203
PCT Pub. Date: Feb. 8, 2018

(65) Prior Publication Data
US 2019/0162054 A1 May 30, 2019

(30) Foreign Application Priority Data
Aug. 2, 2016 (IT) .................. 102016000081363

(51) Int. Cl.
E21B 43/01 (2006.01)
F16L 1/26 (2006.01)
(Continued)

(52) U.S. Cl.
CPC ............ E21B 43/0107 (2013.01); F16L 1/26 (2013.01); F16L 25/12 (2013.01); F16L 23/04 (2013.01)

(58) Field of Classification Search
CPC combination set(s) only.
See application file for complete search history.

(56) References Cited

U.S. PATENT DOCUMENTS 3,233,666 A 2/1966 Geer et al.
3,999,782 A * 12/1976 Shotbolt ............. E21B 43/0107
285/18

(Continued)

FOREIGN PATENT DOCUMENTS

EP 0 733 843 9/1996
WO WO 2010/131096 11/2010

OTHER PUBLICATIONS

Notification Concerning Submission, Obtention or Transmittal of Priority Document for International Application No. PCT/IB2017/054733 dated Oct. 20, 2017.

(Continued)

Primary Examiner — Kyle Armstrong
(74) Attorney, Agent, or Firm — Neal, Gerber & Eisenberg LLP

(57) ABSTRACT

A system for connecting two conduits in a body of water, exhibits a first tubular structure, which is coupled to a conduit that extends along a first longitudinal axis; a second tubular structure, which is coupled to another conduit that extends along a second longitudinal axis and comprises a tubular member, and a sleeve, which is telescopically coupled to the tubular member, and faces the first tubular structure; and an actuating assembly, which comprises a bidirectional translating device configured to selectively displace the sleeve forward and backward to selectively (Continued)

couple and uncouple an end portion of the sleeve and the first tubular structure.

25 Claims, 6 Drawing Sheets

(51) Int. Cl.
    *F16L 25/12*     (2006.01)
    *F16L 23/04*     (2006.01)

(56) References Cited

U.S. PATENT DOCUMENTS

| | | | |
|---|---|---|---|
| 4,188,050 A | | 2/1980 | Lochte |
| 4,436,325 A | * | 3/1984 | Miller ............... F16L 27/12 285/18 |
| 4,561,662 A | | 12/1985 | de Villepoix et al. |
| 4,648,626 A | | 3/1987 | Vinciguerra et al. |
| 4,720,124 A | | 1/1988 | Taylor et al. |
| 7,565,913 B2 | | 7/2009 | Pozzati |
| 2014/0102711 A1 | * | 4/2014 | Hestetun ............. E21B 43/0107 166/344 |
| 2018/0274704 A1 | * | 9/2018 | Mueller ................. F16L 15/00 |
| 2019/0316717 A1 | * | 10/2019 | Sireude ................. F16L 37/138 |

OTHER PUBLICATIONS

International Search Report and Written Opinion for International Application No. PCT/IB2017/054733 dated Oct. 30, 2017.
PCT Demand for International Preliminary Examination and Reply to International Search Report and the associated Written Opinion for International Application No. PCT/IB2017/054733 dated May 4, 2018.
Communication in Cases for Which No Other form is Applicable for International Application No. PCT/IB2017/054733 dated Jun. 4, 2018.
Notification of Transmittal of the International Preliminary Report on Patentability (Form PCT/IPEA/416) for International Application No. International Application No. PCT/IB2017/054733 dated Jul. 3, 2018.
Offshore Technology Conference 24307 presentation "Steps to Subsea Factory" by O. Oekland et al, Oct. 29, 2013 (10 pages).

* cited by examiner

CONNECTING SYSTEM AND METHOD FOR CONNECTING TWO CONDUITS IN A BODY OF WATER

PRIORITY CLAIM

This application is a national stage application of PCT/IB2017/054733, filed on Aug. 2, 2017, which claims the benefit of and priority to Italian Patent Application No. 102016000081363, filed on Aug. 2, 2016, the entire contents of which are each incorporated by reference herein.

TECHNICAL FIELD

The present disclosure relates to a connecting system for connecting two conduits in a body of water.

In particular, the present disclosure relates to a connecting system for fluidically connecting the conduits of a temporary or permanent underwater hydrocarbon production facility.

BACKGROUND

In the oil & gas sector, the creation of temporary or permanent underwater facilities for extracting and/or producing hydrocarbons from wells made in the bed of a body of water is generally known. In the context of the present description, the term "permanent" shall be understood to mean underwater facilities destined for working on the bed of the body of water for an unspecified number of years. In the following description, "hydrocarbon production" shall be understood to mean the extraction of hydrocarbons, the treatment of hydrocarbons, the treatment of fluids related to the production of hydrocarbons and/or the subsequent transport.

Underwater hydrocarbon production facilities can be located level with or close to underwater wells or in intermediate places, and they can take on various configurations on a bed of a body of water depending on the configuration of the well or the well field. Moreover, underwater hydrocarbon production facilities can be situated in shallow water or deep water and in all geographical areas regardless of whether the environmental conditions are relatively easy or relatively extreme.

The concept of an underwater hydrocarbon production facility was developed by various operators in the field with the aim of rationalizing the production of hydrocarbons from underwater wells. In short, an underwater hydrocarbon production facility is part of a relatively complex facility that comprises an underwater hydrocarbon production facility and pipes for relatively long distance transport between the underwater facilities and surface structures. The exploitation of underwater oil and/or gas or multiphase deposits by underwater hydrocarbon production facilities, which foresee the extraction and transport of the hydrocarbon to the surface or to the coast has been underway for some time and is expected to grow in the near future with increasingly complex facilities aimed at optimizing costs. Recent technological developments in underwater devices suitable for operating at a relatively great depth and the relatively great interest of oil companies have facilitated the feasibility of relatively complex systems, extended the potential of underwater production facilities and made it possible to produce facilities also containing active process elements in water, such as arranged on the bed of the body of water. The main underwater treatment processes are: single phase or multi-phase pumping, compression and pumping of the gaseous fluid; two-phase and three-phase separation (for example liquid/liquid, gas/liquid, solid/liquid, oil/water/gas; deposit or sea water or hydrocarbon treatment and pumping and injection of water or gas in the well and injection of chemical products.

Further information on the current state of underwater hydrocarbon production and process facilities is available in the document OTC 24307 "STEPS TO THE SUBSEA FACTORY" by Rune Ramberg (Statoil), Simon R H Davies (Statoil), Hege Rognoe (Statoil), Ole Oekland (Statoil).

Underwater hydrocarbon production facilities undoubtedly often provide numerous advantages compared to surface ones, however, their construction, maintenance and control involve connecting and possibly fluidically disconnecting the function modules from the interconnecting unit inside the body of water to be able to maintain and/or repair them on the surface.

Connecting systems for conduits in a body of water can comprise both "permanent devices" such as devices which make it possible to keep the two conduits connected and make the seal, and "temporary devices" such as Remote Operated Vehicle ("ROV") auxiliary devices which allow the operations needed for the connection to be carried out during the installation and/or maintenance phase. Generally, the connecting systems must principally perform two functions: recover the distance that separates the free ends of the two conduits; and seal the two conduits.

EP Patent No. 0733843, U.S. Pat. Nos. 4,648,626, 4,720,124, 4,561,662, 7,565,913 describe the technical solutions for carrying out at least one of the two functions. However, the above documents are not able to create a connecting system that is relatively compact, reversible and simple to use.

SUMMARY

A feature of the present disclosure is to create a connecting system for connecting two conduits in a body of water without certain of the inconveniences of certain of the known art.

A system is developed according to the present disclosure for connecting two conduits in a body of water, the connection system comprising a first tubular structure coupled to a conduit and extending along a first longitudinal axis; a second tubular structure, which is coupled to another conduit, extends along a second longitudinal axis, and comprises a tubular member, and a sleeve, which is telescopically coupled to the tubular member, and faces the first tubular structure; and an actuating assembly comprising a bidirectional translating device to selectively displace the sleeve forward and backward so as to selectively couple and uncouple an end portion of the sleeve and the first tubular structure, wherein the bidirectional translating device comprises an actuator comprising a screw/nut mechanism configured to selectively slide the sleeve in relation to the tubular member in two opposite directions and parallel to the second longitudinal axis. In this way, the bidirectional translating device makes it possible to bridge the gap between the conduits to be connected, to couple the sleeve and the first tubular structure or to uncouple the sleeve and the first tubular structure and to arrange the free ends of the sleeve and the first tubular structure at a certain distance from each other. In this way, it is possible to create a controlled and micrometric positioning, create elevated coupling forces and prevent the unwanted reversibility of the movement by applying axial forces to the sleeve. Whereas, reversibility is guaranteed by actuating the actuator in the opposite direction.

In particular, the bidirectional translating device is only mounted onto the second tubular structure. In this way, the actuation of the bidirectional translating device does not require any intervention on the first tubular structure.

In further detail, the bidirectional translating device comprises a first frame integral with the tubular member; and a second frame integral with the sleeve and slidingly coupled to the first frame along the second longitudinal axis. This measure prevents the sleeve from rotating in relation to the tubular member.

In particular, the screw/nut mechanism comprises a threaded sleeve, which exhibits an outer thread, is coaxial and integral with the sleeve and defines the screw of the screw/nut mechanism; and a threaded ring, which exhibits an inner thread, meshes with the threaded sleeve and defines the nut of the screw/nut mechanism. In this way, the forces applied to the sleeve are uniformly distributed around the second longitudinal axis.

In particular, the actuator comprises a worm wheel integral with the threaded ring around the threaded sleeve; an endless screw in mesh with the worm wheel; and a first mechanical interface integral with a free end of the endless screw. The actuator is basically completely mechanical and can be operated by rotating the threaded ring through a ROV.

In general, the actuating assembly comprises a first clamping device configured to selectively seal the coupling between the first tubular structure and the sleeve and release the coupling between the first tubular structure and the sleeve; and a second clamping device configured to selectively seal a coupling between the tubular member and the sleeve and release the coupling between the tubular member and the sleeve. In this way, the coupling between the first tubular structure and the sleeve and the coupling between the sleeve and the tubular member can be sealed and released. In particular, the first clamping device is mounted onto the second frame. The second clamping device, instead, is positioned on the first frame.

According to certain embodiments, the bidirectional translating device and the first and the second clamping device can be selectively operated by respective mechanical interfaces through a ROV and relative auxiliary installation and actuation equipment, in particular, the mechanical interfaces are arranged on the same side of the connecting system, are equally oriented and close to one another. In this way, a ROV is able to translate the sleeve and activate the first and the second clamping device from a single position above the system.

In particular, the first tubular structure and the sleeve are configured to enable a reversible seal. In this case, the first tubular structure and the sleeve have respective flanges, which are configured to be arranged in mutual contact and define an annular protrusion; the first clamping device comprises a clamping ring, which exhibits an annular cavity, which is configured to house the annular protrusion; the annular protrusion and the cavity being configured so that the clamping action of the clamping ring on the annular protrusion generates a force parallel to the first and second longitudinal axis and radial forces towards the first and the second longitudinal axis.

In particular, the connecting system comprises at least a first annular seal, which is arranged between the first tubular structure and the sleeve and is compressed by the first clamping device. In this way, the first annular seal can be sealed in a relatively simple and reversible manner, after making the coupling between the sleeve and the first tubular structure.

In particular, the sleeve and the tubular member are configured to enable a reversible seal. In fact, the tubular member and the sleeve are configured to form an interspace between the tubular member and the sleeve and a guide portion for the sleeve, wherein the tubular member and the sleeve are mutually and slidingly in contact; the connecting system comprising a second annular seal housed in the interspace; said second annular seal being expanded by the second clamping device.

In particular, the second clamping device comprises a wedge transmission, which extends through the tubular member and inside the interspace and acts with the second clamping device to transform the radial compression of the clamping device into an axial compression on the second annular seal, which determines a radial expansion of the second annular seal. According to a particular embodiment, the connecting system comprises at least one first centering member integral with the first tubular structure; and at least a second centering member integral with the sleeve; the first and the second centering member being configured to be inserted one into the other and to align the first and the second longitudinal axis when the sleeve is advanced towards the first tubular structure. In this way, it is possible to align the first and the second longitudinal axis before the sleeve and the first tubular structure are arranged in mutual contact and sealed.

In particular, the connecting system comprises at least two tie rods, each selectively connected to the first and second tubular structure to prevent the first and the second tubular structure from becoming spaced apart during the coupling of the same.

The present disclosure can be used advantageously in the sector of underwater hydrocarbon production facilities of the type comprising a plurality of function modules, comprising, each, at least one conduit configured to convey fluids; one interconnecting unit configured for interconnecting said function modules and comprising at least another conduit configured to convey fluids; and at least one connecting system for each one of the function modules configured to connect said conduits in a releasable manner. In this way, when a function module is arranged in a certain position in relation to the interconnecting module and the sleeve is facing the first tubular structure, it is possible to fluidically connect said conduits and, similarly, disconnect said conduits.

A further feature of the present disclosure is to provide a method without the inconveniences of the known methods.

According to the present disclosure, a method is provided for connecting two conduits in a body of water, the method comprising the steps of:

arranging a first tubular structure facing each other, which is mounted onto a conduit and extends along a first longitudinal axis, and a second tubular structure, which is mounted onto another conduit, extends along a second longitudinal axis and comprises a tubular member, and a sleeve, which is telescopically coupled to the tubular member; and selectively displacing the sleeve forward or backward in relation to the tubular member so as to couple or respectively uncouple an end portion of the sleeve and the first tubular structure.

Additional features and advantages are described in, and will be apparent from the following Detailed Description and the figures.

BRIEF DESCRIPTION OF THE DRAWINGS

Further characteristics and advantages of the present disclosure will become clear from the following description of certain embodiments, with reference to the Figures in the accompanying drawings, wherein.

DETAILED DESCRIPTION

Figure 1:
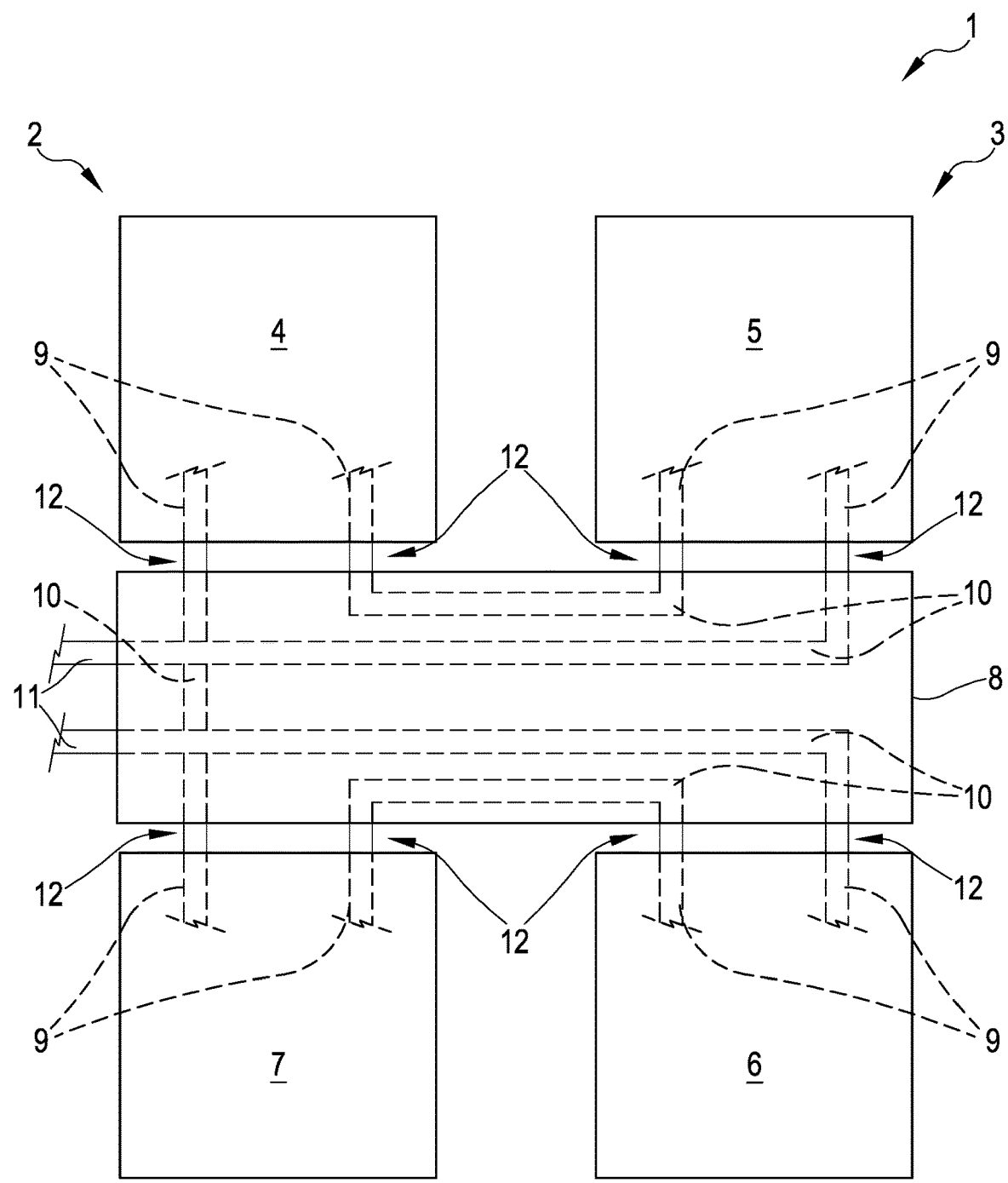
FIG. 1 is a schematic plan view, with parts removed for clarity, of an underwater hydrocarbon production facility.

Referring now to the example embodiments of the present disclosure illustrated in FIGS. 1 to 7, an underwater hydrocarbon production facility is globally indicated with number 1 in FIG. 1. The facility 1 is arranged on a bed 2 of a body of water close to an underwater well or a well field (not illustrated in the accompanying Figures), and comprises an assembly 3, which comprises a plurality of function modules 4, 5, 6 and 7 configured to treat hydrocarbons or related operations, such as, for example treatment deposit or sea water, and an interconnecting unit 8 configured to be arranged on the bed 2 of the body of water and to connect the function modules to each other 4, 5, 6 and 7. Each of the function modules 4, 5, 6, and 7 comprises at least one conduit 9 arranged inside the function module 4, 5, 6, and 7, while the interconnecting unit 8 comprises a plurality of conduits 10 configured to be fluidically connected to the conduits 9, of one of the function modules 4, 5, 6 and 7, and to the supply and delivery conduits 11.

In further detail, each of the function modules 4, 5, 6 and 7 houses a respective appliance configured to treat hydrocarbons or carry out operations related to the treatment of hydrocarbons. In the present description, the term appliance indicates any one or more of the following appliances such as, but not limited to: multiphase pump (function: multiphase pumping); Liquid pump; Gas Compression; Separator liquid/liquid; Separator gas/liquid; Separator solid/water; Heat exchanger; Water injection pump; Chemical injection device; Gas treatment device; Oil treatment device; and water treatment device. The interconnecting unit 8 also comprises valves (which are not illustrated in FIG. 1) which are housed inside the interconnecting unit 8 to regulate the flow of the process fluids.

The interconnecting module 8 and each function module 4, 5, 6 and 7 are structured so that they define a mutual coupling based on being arranged in a predefined, spatial position wherein the free end of each conduit 9 faces a free end of a respective conduit 10 to make the fluidic connection between the conduits 9 and 10.

The underwater facility also comprises a plurality of systems 12 configured to connect the conduits 9 and 10. Each connecting system 12 is mounted, in part, onto the interconnecting module 8 and, in part, onto the function module 4, 5, 6, 7.

Figure 2:
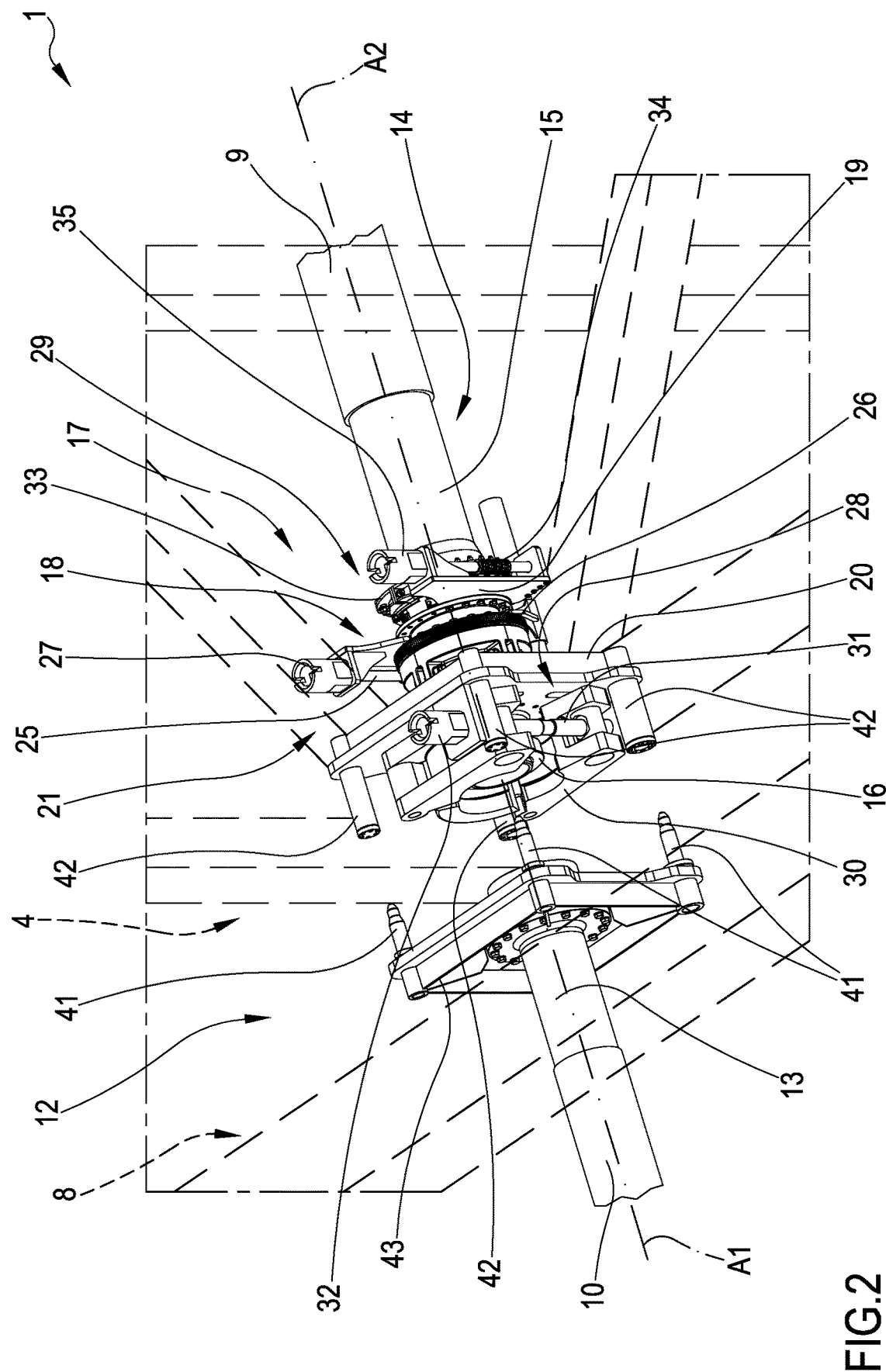
FIG. 2 is a perspective view, with parts removed for clarity, of a detail of the underwater facility in FIG. 1, provided with a connecting system configured to connect two conduits and made in agreement with the present disclosure.

With reference to FIG. 2, the connecting system 12 configured to connect the conduits 9 and 10 in the body of water comprises a tubular structure 13 that is coupled to the conduit 10, extends along a longitudinal axis A1; and a tubular structure 14, which is coupled to the conduit 9, extends along a longitudinal axis A2 and comprises a tubular member 15, and a sleeve 16, which is telescopically coupled to the tubular member 15, and faces the tubular structure 13; and an actuating assembly 17 comprising a bidirectional translating device 18 configured to selectively insert or extract an end portion of the sleeve 16 in the tubular structure 13.

The bidirectional translating device 18 comprises a frame 19 integral with the tubular member 15; a frame 20, which is integral with the sleeve 16 and is slidingly coupled to the frame 19 along the longitudinal axis A2; and an actuator 21 configured to move the sleeve 16 and the frame 20 in relation to the frame 19 in two opposite directions parallel to the longitudinal axis A2.

Figure 3:
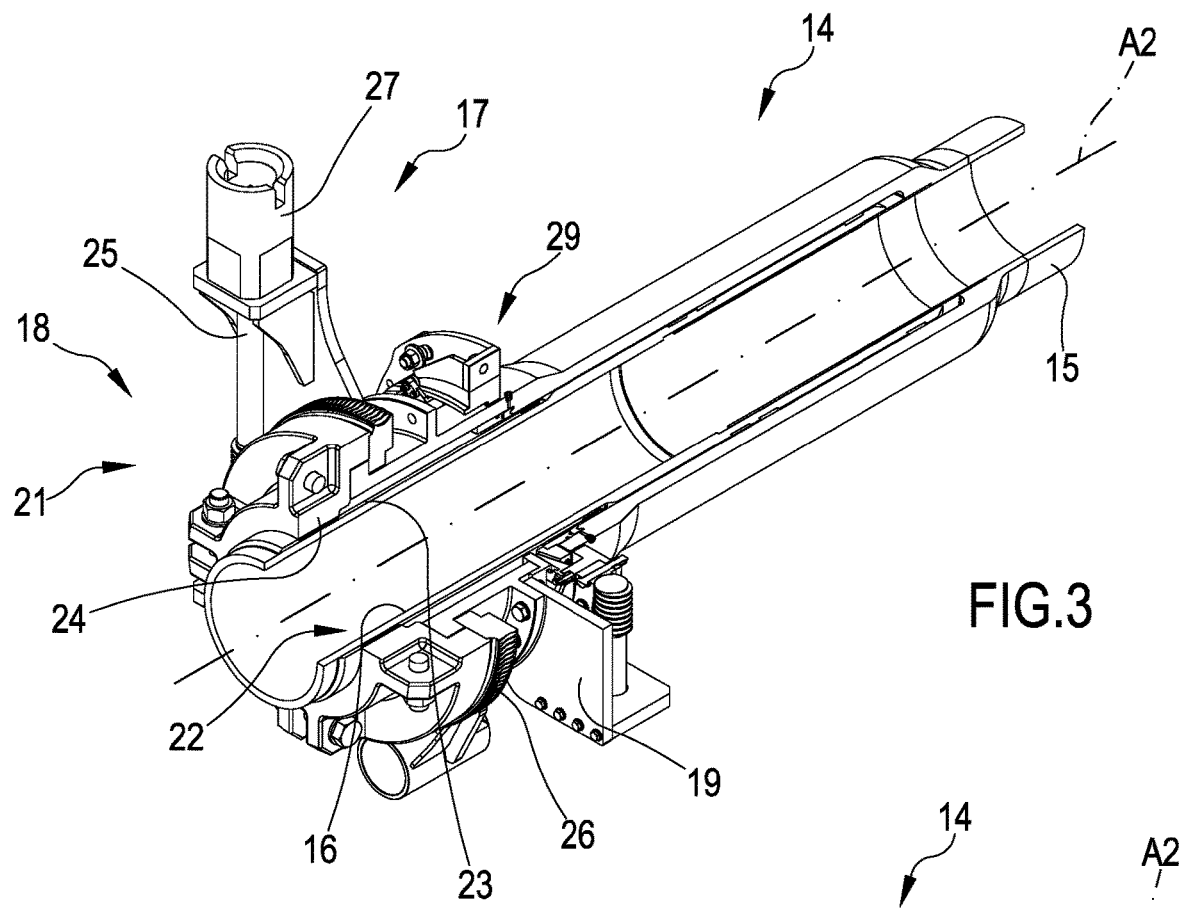
FIGS. 3 and 4 are perspective views, with sectioned parts and parts removed for clarity, of a detail of the connecting system in FIG. 2 in two different operative configurations.
Figure 4:
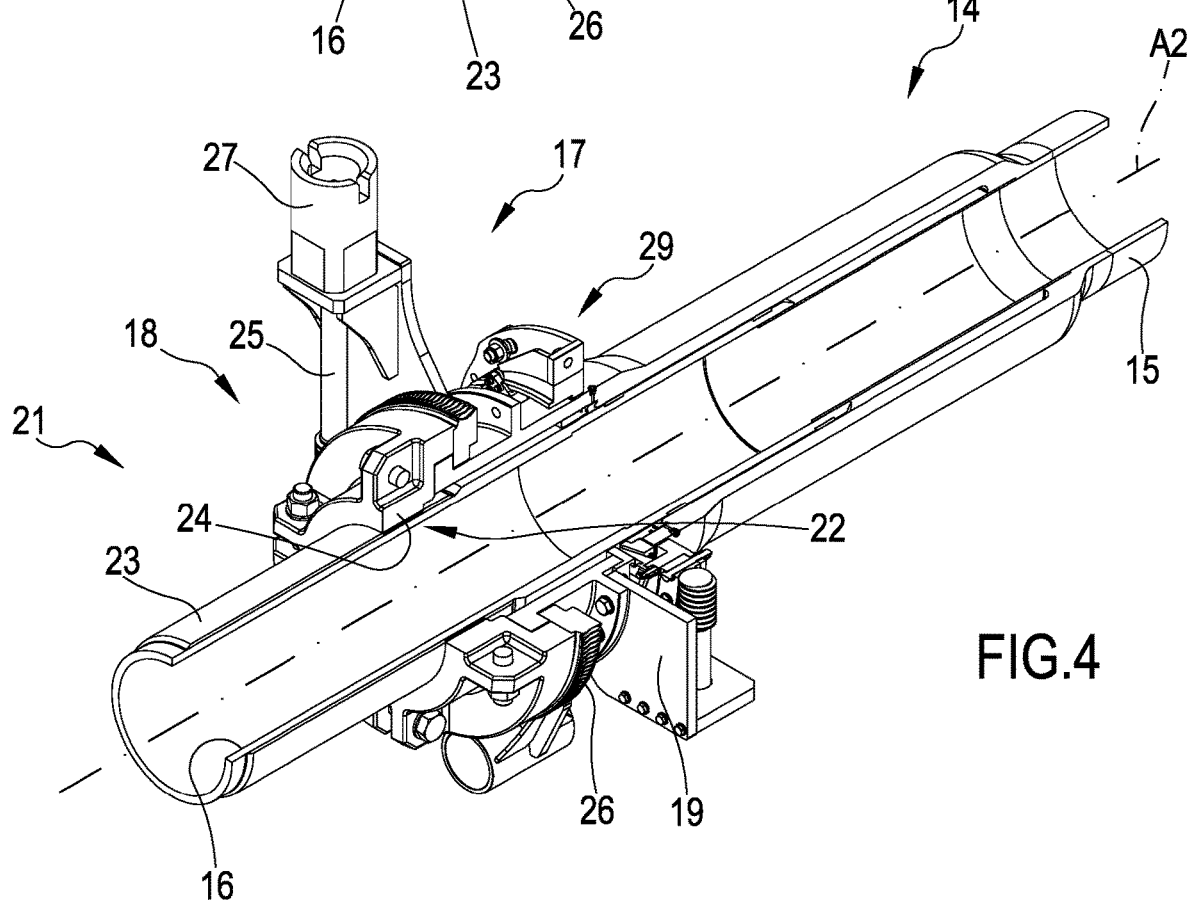

In particular and with reference to FIG. 3 or 4, the actuator 21 comprises a screw/nut mechanism 22 configured to make the translation of the sleeve 16. In the illustrated case, the screw/nut mechanism 22 comprises a threaded sleeve 23, which exhibits an outer thread, is coaxial and integral with the sleeve 16 and defines the screw of the screw/nut mechanism 22; and a ring 24, which exhibits an inner thread, meshes with the threaded sleeve 23, is supported in a rotating manner by the frame 19, and defines the nut of the screw/nut mechanism 22. The actuator 21 comprises an endless screw 25; a worm wheel 26 configured to rotate the ring 24 around the threaded sleeve 23 and meshes with the endless screw; and a mechanical interface 27 integral with the free end of the endless screw 25. In particular, the endless screw 25 is supported in a rotating manner by the frame 19, while the worm wheel 26 is integral with the ring 24. The actuator 21 of this embodiment is a mechanical type actuator and is operated by rotating the mechanical interface 27, for example, with a ROV equipped for performing manipulations.

According to another embodiment (which is not illustrated in the accompanying Figures), the mechanical actuator comprising the endless screw and the worm wheel is replaced by a mechanical actuator comprising a conical reel operated by a ROV and a conical toothed wheel integral with the ring.

With reference to FIG. 2, the actuating device 17 comprises a clamping device 28 configured to selectively clamp the tubular structure 13 elastically around the end portion of the sleeve 16 and release the tubular structure 13 from the end portion of the sleeve 16; and a clamping device 29 configured to selectively clamp the tubular member 15 elastically around the sleeve 16 and release the tubular member 15 from the sleeve 16.

The clamping device 28 is supported by the frame 20 and comprises a clamping ring 30, which is configured like an open ring and can be clamped around the tubular structure 13; and an actuator 31, which, in this case, is defined by a screw, and a mechanical interface 32, which is integral with a free end of the screw.

The clamping device 29 is supported by the frame 19 and comprises a clamping ring 33, which is configured like an open ring and can be clamped around the tubular structure 14; an actuator 34, which, in this case, comprises a screw that closes the clamping ring 33, and a mechanical interface 35, which is integral with a free end of the screw.

The mechanical interfaces 27, 32, and 35 are identical and can be operated by the same auxiliary manipulation appliance piloted by the ROV itself (which is not illustrated in the accompanying Figures). Moreover, the mechanical interfaces 27, 32, and 35 are arranged on the same side of the connecting system 12, are equally oriented and close to one another to facilitate the manipulation operations with the ROV (not illustrated in the accompanying Figures) to optimize the integration of the connecting system with the modules onto which the connecting system is mounted.

Figure 5:
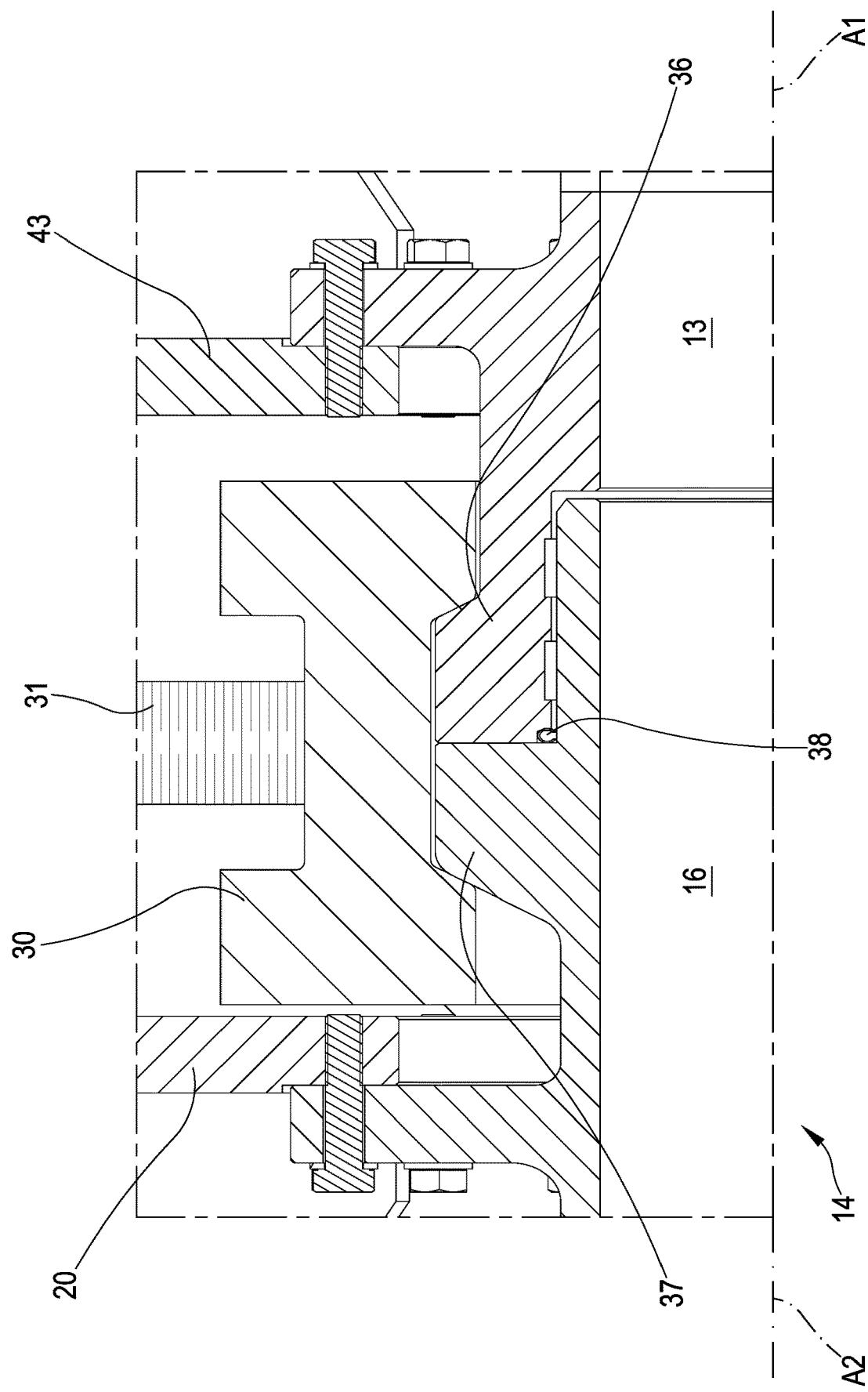
FIG. 5 is a longitudinal section view, on an enlarged scale and with parts removed for clarity, of a detail of the connecting system in FIG. 2 when connected.

With reference to FIG. 5, the tubular structure 13 comprises a flange 36 and the sleeve 16 comprises a flange 37 configured to be arranged in contact with the flange 36. The flanges 36 and 37, in mutual contact, define a cylindrical-shaped protrusion and the clamping ring 30 exhibits a housing cavity for the protrusion and is complementary to the protrusion, the protrusion and the cavity being configured so that the closure of the clamping ring 30 generates a force parallel to the first and to the second longitudinal axis A1 and A2 and radial forces towards the first and the second longitudinal axis A1 and A2.

The end portion of the sleeve 16 is configured to form an interspace between the tubular structure 13 and the portion itself when arranged inside the tubular structure 13. The connecting system 12 (FIG. 1) comprises an annular seal 38 housed in the interspace and arranged level with the flanges 36 and 37.

Figure 6:
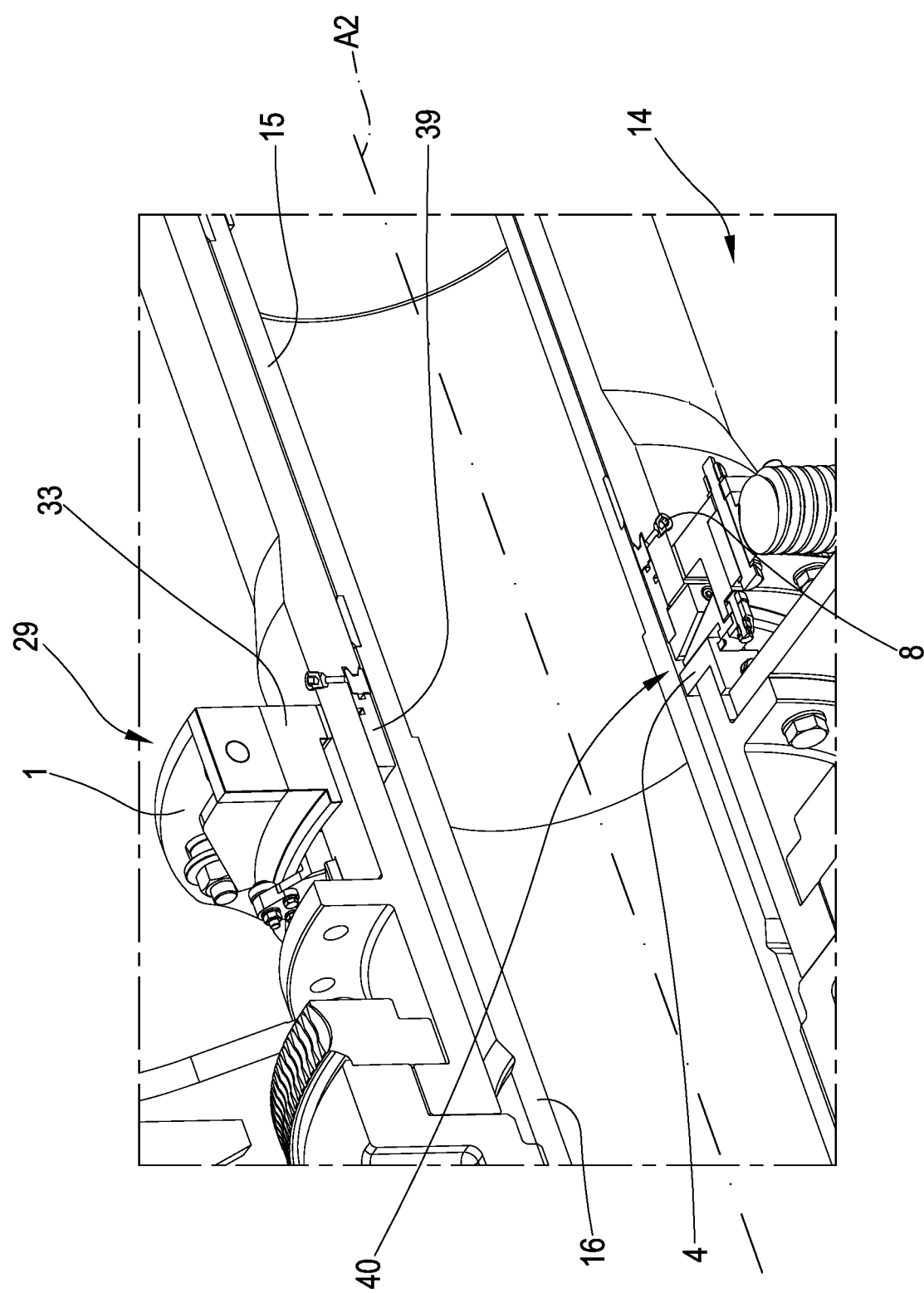
FIG. 6 is a perspective view, on an enlarged scale, with sectioned parts and parts removed for clarity, of a further detail of the connecting system in FIG. 1 when connected.

With reference to FIG. 6, the tubular member 15 and the sleeve 16 are configured to form an interspace with the sleeve 16 and a guide portion for the sleeve 16 wherein the tubular member 15 and the sleeve 16 are in mutual contact. The connecting system 12 comprises an annular seal 39 housed in the interspace and arranged level with the clamping ring 33.

With reference to FIG. 5, the clamping device 29 is configured to expand the annular seal 39 and seal the coupling between the tubular member 15 and the sleeve 16. For this purpose, the clamping device 29 comprises a wedge transmission 40, which is arranged in part outside the tubular member 15 and in part inside the tubular member 15, extends through openings made in the tubular member 15, and is configured to transform the axial compression of the clamping ring 33 into a radial expansion of the annular seal 39.

According to a variation (which is not illustrated in the present disclosure), the clamping device comprises a tension system with tie rods controlled by a plumbing spanner replacing the wedge tension system.

With reference to FIG. 2, the connecting system 12 comprises at least one centering member 41 integral with the tubular structure 13; and at least one centering member 42 integral with the sleeve 16. The centering members 41 and 42 are configured to mutually interpenetrate each other by at least one coupling to align the longitudinal axes A1 and A2 when the sleeve 16 is advanced towards the first tubular structure 13. In the illustrated case, the connecting system 12 comprises a frame 43 integral with the tubular structure 13, which supports a plurality of centering members 41 arranged around the tubular structure 13, and the frame 20 supports a plurality of centering members 42 configured to be coupled with respective centering members 41.

Figure 7:
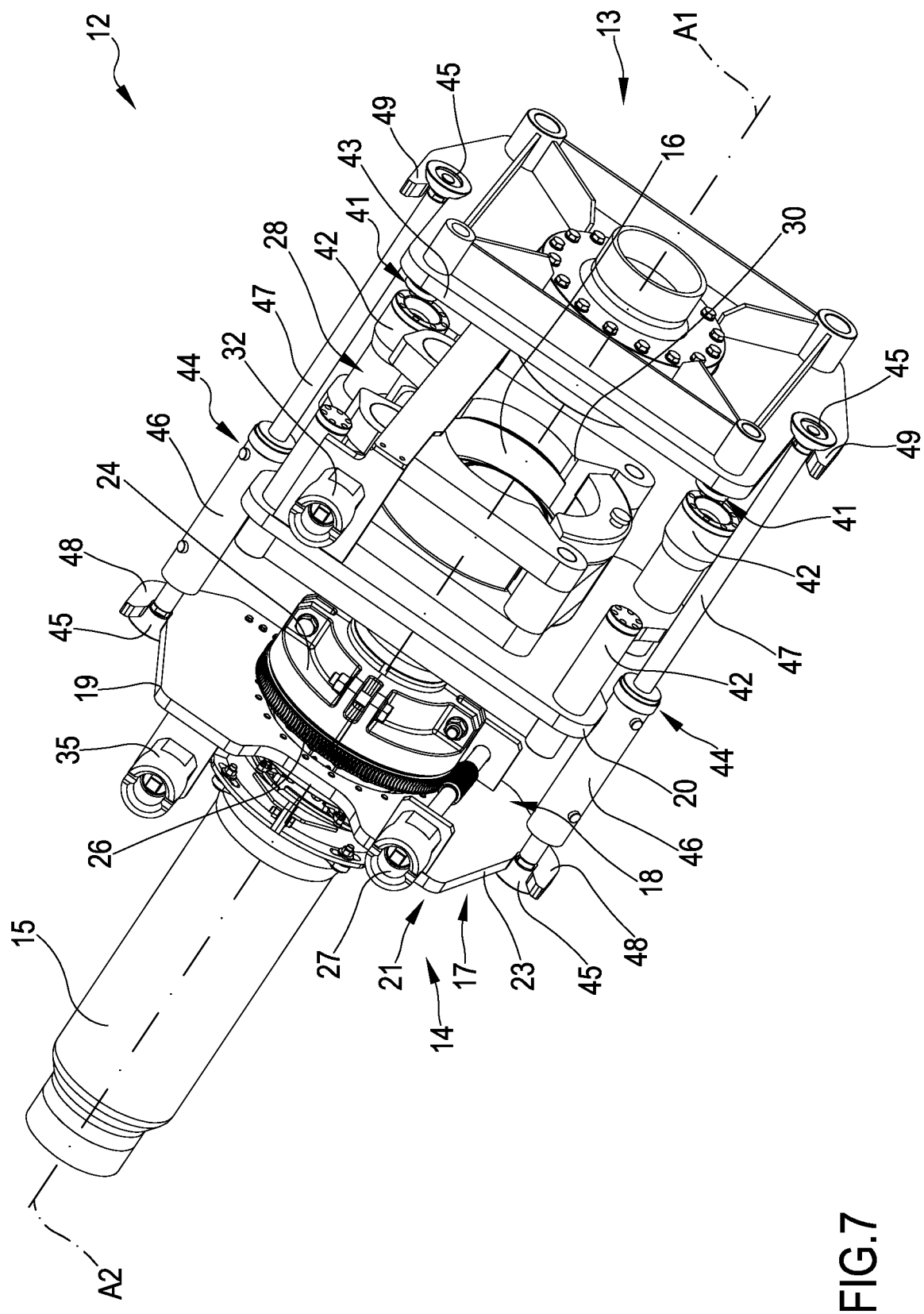
FIG. 7 is a perspective view, with parts removed for clarity, of a particular embodiment of the present disclosure.

With reference to the embodiment in FIG. 7, the connecting system 12 comprises two tie rods 44, each of which is hooked to the tubular structure 13 and to the tubular structure 14. In particular, level with its opposite ends, each tie rod exhibits two articulated heads 45. Each tie rod 44 has a variable length and, in this case, is illustrated as a hydraulic cylinder comprising a double-action cylinder 46 and a stem 47.

To allow the tie rods 44 to hook to the tubular structures 13 to 14, the latter exhibit respective hooks 48 and 49, which, in this case, are made in the frames 19 and 42 respectively.

The tie rods 44 are arranged in the seats formed by the hooks 48 and 49 and serve to prevent the tubular structures from becoming spaced apart during the coupling phase between the tubular structures 13 and 14. A ROV (which is not illustrated in the accompanying Figures) exhibits a manipulator configured to arrange the tie rods 44 in the respective seats of the hooks 48 and 49 and a hydraulic supply to operate the cylinders 46 to regulate the length of the tie rods 44.

During the coupling phase between the tubular structures 13 and 14 the centering, which takes place by the relative sliding between inclined surfaces, generates forces that would tend to distance the tubular structures 13 and 14 and overload the screw/nut mechanism 22 (FIGS. 3 and 4). Consequently, the tie rods 44 serve to prevent the tubular structures 13 and 14 from becoming spaced apart and overloading the screw/nut mechanism 22.

Finally, it is clear that variations can be made to the present disclosure in relation to the described embodiment with reference to the accompanying figures without going beyond the protective scope of the accompanying claims. For example, in the described example, the connecting system configured to connect two conduits in a body of water with reference to an underwater hydrocarbon production facility, with the understanding that the connecting system and the method claimed can also be used in the underwater context in the field of oil & gas. Accordingly, various changes and modifications to the presently disclosed embodiments will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A conduit connecting system comprising:
a first tubular structure which is coupleable to a conduit in a body of water and extends along a first longitudinal axis;
a second tubular structure which is coupleable to another conduit in the body of water, extends along a second longitudinal axis and comprises:
a tubular member, and
a sleeve which is telescopically coupleable to the tubular member and faces the first tubular structure; and
an actuating assembly comprising a bidirectional translating device configured to selectively displace the sleeve forward to selectively couple an end portion of the sleeve and the first tubular structure and selectively displace the sleeve backward to selectively uncouple the end portion of the sleeve and the first tubular structure, wherein the bidirectional translating device comprises an actuator comprising:
an actuation assembly configured to selectively slide the sleeve in relation to the tubular member in two opposite directions parallel to the second longitudinal axis, the actuation assembly comprising:
a threaded sleeve having an outer thread and defining a screw of the actuation assembly, the threaded sleeve being integral with the sleeve, and
a threaded ring having an inner thread and defining a nut of the actuation assembly, the threaded ring configured to mesh with the threaded sleeve, a worm wheel integral with the threaded ring,
an endless screw, and
a first mechanical interface integral with a free end of the endless screw.

2. The conduit connecting system of claim 1, wherein the bidirectional translating device is mounted onto only the second tubular structure.

3. The conduit connecting system of claim 1, wherein the bidirectional translating device comprises:
a first frame integral with the tubular member; and
a second frame integral with the sleeve and slidingly coupleable to the first frame along the second longitudinal axis.

4. The conduit connecting system of claim 1, wherein:
the first tubular structure and the sleeve exhibit respective flanges which are configured to be arranged in mutual contact and define an annular protrusion;
the first clamping device comprises a clamping ring which exhibits an annular cavity configured to house the annular protrusion;
the annular protrusion and the cavity are configured such that the clamping action of the clamping ring on the annular protrusion generates a force parallel to the first longitudinal axis and to the second longitudinal axis and radial forces towards the first longitudinal axis and the second longitudinal axis.

5. The conduit connecting system of claim 1, further comprising:
at least one first centering member integral with the first tubular structure; and
at least one second centering member integral with the sleeve;
wherein the first centering member and the second centering member are configured to be inserted one into the other to align the first longitudinal axis and the second longitudinal axis when the sleeve is advanced towards the first tubular structure.

6. The conduit connecting system of claim 1, further comprising at least two tie rods, each selectively connected to the first tubular structure and the second tubular structure to prevent the first tubular structure and the second tubular structure from becoming spaced apart during a coupling of the first tubular structure and the second tubular structure.

7. An underwater hydrocarbon production facility comprising:
a function module comprising a conduit configured to convey fluids;
an interconnecting unit configured to interconnect said function module with another function module and comprising a conduit configured to convey fluids; and
a connecting system configured to releasably connect the conduit of the function module to the conduit of the interconnecting unit, the connecting system comprising:
a first tubular structure which is coupleable to the conduit of the interconnecting unit and extends along a first longitudinal axis;
a second tubular structure which is coupleable to the conduit of the function module, extends along a second longitudinal axis and comprises:
a tubular member, and
a sleeve which is telescopically coupleable to the tubular member and faces the first tubular structure; and
an actuating assembly comprising a bidirectional translating device configured to selectively displace the sleeve forward to selectively couple an end portion of the sleeve and the first tubular structure and selectively displace the sleeve backward to selectively uncouple the end portion of the sleeve and the first tubular structure, wherein the bidirectional translating device comprises an actuator comprising:
an actuation assembly configured to selectively slide the sleeve in relation to the tubular member in two opposite directions parallel to the second longitudinal axis, the actuation assembly comprising:
a threaded sleeve having an outer thread and defining a screw of the actuation assembly, the threaded sleeve being integral with the sleeve, and
a threaded ring having an inner thread and defining a nut of the actuation assembly, the threaded ring configured to mesh with the threaded sleeve,
a worm wheel integral with the threaded ring,
an endless screw, and
a first mechanical interface integral with a free end of the endless screw.

8. A method for arranging conduits in a body of water, the method comprising:
arranging a first tubular structure which is coupleable to a conduit and extends along a first longitudinal axis to face a second tubular structure which is coupleable to another conduit, extends along a second longitudinal axis, and comprises a tubular member and a sleeve which is telescopically coupleable to the tubular member;
activating a bidirectional translating device to selectively displace the sleeve forward to selectively couple an end portion of the sleeve and the first tubular structure, the bidirectional translating device comprises an actuator comprising:
an actuation assembly comprising a threaded sleeve having an outer thread and defining a screw of the actuation assembly, the threaded sleeve being integral with the sleeve, and a threaded ring having an inner thread and defining a nut of the actuation assembly, the threaded ring configured to mesh with the threaded sleeve,
a worm wheel integral with the threaded ring,
an endless screw, and
a first mechanical interface integral with a free end of the endless screw; and
activating the bidirectional translating device to selectively displace the sleeve backward to selectively uncouple the end portion of the sleeve and the first tubular structure.

9. The method of claim 8, further comprising guiding the sleeve by a first frame integral with the tubular member and a second frame integral with the sleeve, wherein the first frame and the second frame are slidingly coupleable to each other along the second longitudinal axis.

10. The method of claim 8, further comprising selectively sealing a coupling between the first tubular structure and the sleeve and selectively releasing the seal of the coupling between the first tubular structure and the sleeve.

11. The method of claim 8, further comprising selectively sealing a coupling between the tubular member and the sleeve and selectively releasing the seal of the coupling between the tubular member and the sleeve.

12. The method of claim 8, further comprising:
controlling, via a first mechanical interface, a translation of the sleeve in relation to the tubular member;

controlling, via a second mechanical interface, a seal between the first tubular structure and the sleeve; and controlling, via a third mechanical interface, a seal between the tubular member and the sleeve.

13. The method of claim 8, further comprising compressing an annular seal housed between the first tubular structure and the sleeve when the first tubular structure and the sleeve are coupled.

14. The method of claim 8, further comprising compressing an annular seal to determine a radial expansion of the annular seal housed in an interspace between the tubular member and the sleeve.

15. The method of claim 8, further comprising aligning, by at least one first centering member integral with the first tubular structure and at least a second centering member integral with the sleeve, the first tubular structure and the sleeve to make the first longitudinal axis and the second longitudinal axis coincide.

16. The method of claim 8, further comprising connecting the first tubular structure and the second tubular structure by least two tie rods to prevent the first tubular structure and the second tubular structure from becoming spaced apart during a coupling of the first tubular structure and the second tubular structure.

17. A conduit connecting system comprising:
a first tubular structure which is coupleable to a conduit in a body of water and extends along a first longitudinal axis;
a second tubular structure which is coupleable to another conduit in the body of water, extends along a second longitudinal axis and comprises:
a tubular member, and
a sleeve which is telescopically coupleable to the tubular member and faces the first tubular structure; and
an actuating assembly comprising:
a bidirectional translating device configured to selectively displace the sleeve forward to selectively couple an end portion of the sleeve and the first tubular structure and selectively displace the sleeve backward to selectively uncouple the end portion of the sleeve and the first tubular structure, wherein the bidirectional translating device comprises an actuator comprising an actuation assembly configured to selectively slide the sleeve in relation to the tubular member in two opposite directions parallel to the second longitudinal axis, and the bidirectional translating device is selectively actuated, via a remote operated vehicle, by a first mechanical interface arranged on a first side of the conduit connecting system,
a first clamping device configured to selectively seal a coupling between the first tubular structure and the sleeve and configured to release the coupling between the first tubular structure and the sleeve, wherein the first clamping device is selectively actuated, via the remote operated vehicle, by a second mechanical interface arranged on the same first side of the conduit connecting system, and
a second clamping device configured to selectively seal a coupling between the tubular member and the sleeve and configured to release the coupling between the tubular member and the sleeve, wherein the second clamping device is selectively actuated, via the remote operated vehicle, by a third mechanical interface arranged on the same first side of the conduit connecting system.

18. The conduit connecting system of claim 17, wherein the bidirectional translating device is mounted onto only the second tubular structure.

19. The conduit connecting system of claim 17, wherein the bidirectional translating device comprises:
a first frame integral with the tubular member; and
a second frame integral with the sleeve and slidingly coupleable to the first frame along the second longitudinal axis.

20. The conduit connecting system of claim 17, further comprising at least one first annular seal which is arranged between the first tubular structure and the sleeve and is compressed by the first clamping device.

21. The conduit connecting system of claim 17, wherein the tubular member and the sleeve are configured to form an interspace with a guide portion for the sleeve, the tubular member and the sleeve are mutually and slidingly in contact, and further comprising a second annular seal housed in the interspace, said second annular seal being expanded by the second clamping device.

22. The conduit connecting system of claim 21, wherein the second clamping device comprises a wedge transmission which extends through the tubular member and into the interspace and transforms a radial compression to an axial compression on the second annular seal to determine a radial expansion of the second annular seal.

23. The conduit connecting system of claim 17, wherein:
the first tubular structure and the sleeve exhibit respective flanges which are configured to be arranged in mutual contact and define an annular protrusion;
the first clamping device comprises a clamping ring which exhibits an annular cavity configured to house the annular protrusion;
the annular protrusion and the cavity are configured such that the clamping action of the clamping ring on the annular protrusion generates a force parallel to the first longitudinal axis and to the second longitudinal axis and radial forces towards the first longitudinal axis and the second longitudinal axis.

24. The conduit connecting system of claim 17, further comprising:
at least one first centering member integral with the first tubular structure; and
at least one second centering member integral with the sleeve;
wherein the first centering member and the second centering member are configured to be inserted one into the other to align the first longitudinal axis and the second longitudinal axis when the sleeve is advanced towards the first tubular structure.

25. The conduit connecting system of claim 17, further comprising at least two tie rods, each selectively connected to the first tubular structure and the second tubular structure to prevent the first tubular structure and the second tubular structure from becoming spaced apart during a coupling of the first tubular structure and the second tubular structure.

* * * * *